03 4,603,940

United States Patent [19]

Shaw et al.

[11] Patent Number: 4,603,940

[45] Date of Patent: Aug. 5, 1986

[54] FIBER OPTIC DYE AMPLIFIER

[75] Inventors: Herbert J. Shaw, Stanford; Michel J. F. Digonnet, Palo Alto; Ralph A. Bergh, Atherton; Wayne V. Sorin, Stanford; Brian H. Kolner, Menlo Park, all of Calif.

[73] Assignee: Board of Trustees of the Leland Stanford Junior University, Stanford, Calif.

[21] Appl. No.: 527,946

[22] Filed: Aug. 30, 1983

[51] Int. Cl.$^4$ .......................... G02B 6/26; G02B 6/36; G02B 6/10

[52] U.S. Cl. .......................... 350/96.15; 350/96.20; 350/96.30

[58] Field of Search ............... 350/96.15, 96.16, 96.20, 350/96.29, 96.30; 372/6

[56] References Cited

U.S. PATENT DOCUMENTS

| | | | |
|---|---|---|---|
| 3,943,358 | 3/1976 | Reymond et al. | 350/96.29 X |
| 4,087,156 | 5/1978 | Kao et al. | 350/96.15 X |
| 4,107,628 | 8/1978 | Hill et al. | 372/6 X |
| 4,336,047 | 6/1982 | Pavlopoulos et al. | 350/96.15 X |
| 4,515,431 | 5/1985 | Shaw et al. | 350/96.15 |

FOREIGN PATENT DOCUMENTS

| | | | |
|---|---|---|---|
| 0070852 | 6/1977 | Japan | 350/96.15 |
| 0093111 | 7/1980 | Japan | 350/96.20 |

OTHER PUBLICATIONS

"Amplification in a Fiber Laser", by Snitzer et al, Applied Optics/vol. 3, No. 10/Oct. 1964.

K. Otsuka et al., "Analysis of a Multistable Semiconductor Light Amplifier," *IEEE Journal of Quantum Electronics*, vol. QE-19, No. 7, Jul. 1983.

H. Injeyan et al., "Light Amplification by Evanescent Wave Coupling in a Multimode Fiber," *Applied Optics*, vol. 21, No. 11, Jun. 1982.

N. Periasamy, "Evanescent Wave-Coupled Dye Laser Emission in Optical Fibers," *Applied Optics*, vol. 21, No. 15, Aug. 1982.

N. Periasamy et al., "Laser Amplification in an Optical Fiber by Evanescent Field Coupling," *Applied Physics*, vol. 24, 1981.

E. P. Ippen et al., "Evanescent-Field-Pumped Dye Laser," *Applied Physical Letters*, vol. 21, No. 7, Oct. 1972.

C. J. Koester, "9A4-Laser Action by Enhanced Total Internal Reflection," *IEEE Journal of Quantum Electronics*, vol. QE-2, No. 9, Sep. 1966.

*Primary Examiner*—William L. Sikes
*Assistant Examiner*—Akm E. Ullah
*Attorney, Agent, or Firm*—Knobbe, Martens, Olson & Bear

[57] ABSTRACT

A fiber optic amplifier as disclosed, comprised of a fiber optic, monomode waveguide which has a core and cladding. Part of the cladding over a predetermined region is removed and replaced by an active medium capable of absorbing light energy at a first wavelength and emitting light energy at a second wavelength. The active medium is a lasing dye which has an index of refraction adjusted to be slightly less than the index of refraction of the fiber core. The amount of cladding which is removed is adjusted such that a predetermined amount of penetration of the evanescent field from a pump light signal coupled into an end of the fiber penetrates the active medium. A probe signal to be amplified causes stimulated emission from the excited dye molecules by penetration of its evanescent field into the dye in the region where the cladding is removed.

In the preferred embodiment a recirculating pump is used to circulate dye through a cavity which is placed over the portion of the fiber where the cladding is removed. The dye molecules in contact with the surface caused by removal of the cladding are continually changed. A temperature control unit maintains the temperature of the dye such that its index of refraction remains tuned to an amount just less than the index of refraction of the core.

30 Claims, 13 Drawing Figures

FIBER OPTIC DYE AMPLIFIER

BACKGROUND OF THE INVENTION

The invention relates to the field of light amplifiers, and, specifically, to the art of fiber optic evanescent field amplifiers using lasing dyes.

It is well known that certain classes of molecules can be excited to higher level energy states, and that they will emit light when they return to lower energy states. This principle has been applied to make lasers and light amplifiers. Some of these devices use neodymium doped fiber optic waveguides and others use lasing dyes. Light energy from a pump light source is coupled to the material to be excited either by transverse pumping or by end pumping to provide the excitation energy. Transverse pumping means the excitation energy is applied to the active medium from outside the fiber from a direction other than the direction of travel of light in the fiber. End pumping means the pumping signal is coupled into the end of the waveguide carrying the output signal of the device. The evanescent field outside the core in these end pumped devices excites the gain medium.

An example of a dye laser device is described by N. Perisamy in "Evanescent Wave-Coupled Dye Laser Emission In Optical Fibers", Applied Optics, Vol. 21, No. 15, Aug. 1, 1982 at page 2693. Perisamy taught dye laser emission into a multimode fiber waveguide. The waveguide was enclosed in a capillary containing a lasing dye which acted as the cladding for the fiber and had a lower index than the fiber core. A laser pumped the dye. The emitted light from the dye was collected in the waveguide.

N. Perisamy and F. P. Schafer taught laser amplification by transverse pumping of a dye surrounding an optical fiber in an article entitled "Laser Amplification In An Optical Fiber By Evanescent Field Coupling" published in Applied Physics, Issue 24, 1981 at pp. 201-203. There a nitrogen laser was used to transversely pump a dye solution external to a multimode fiber carrying a signal to be amplified. The evanescent field of the signal to be amplified triggered emission of light from the excited dye. Another dye laser using the same dye was used to inject the signal to be amplified so that the wavelength of the signal to be amplified matched the wavelength of emission of the excited dye.

Another multimode fiber optic amplifier was taught by H. Injeyan, O. M. Stafsudd and N. G. Alexopoulos in "Light Amplification By Evanescent Wave Coupling In A Multimode Fiber" published by Applied Optics, Vol. 21, No. 11, June 1, 1982 at p. 1928. There a multimode fiber was surrounded by a dye cavity containing a recirculating lasing dye. The dye was temperature controlled, and the fiber was end pumped. The evanescent field of the higher order modes extended into the dye and supplied the excitation energy. As a result, only the higher order modes were amplified, because the lower order modes did not have substantial penetration of their evanescent fields into the dye. The overall gain for the device was approximately 10% because only the higher order modes were amplified and C.W. pumping was used. The higher order modes carry only part of the total input light.

All these multimode devices have the disadvantage of modal dispersion effects. Modal dispersion effects occur in pulses launched down such a waveguide causing the pulses to spread out and lose their original shape such that eventually they become unreadable. Further, in multimode waveguides only the higher order modes have significant penetration of their evanescent fields into the cladding. This evanescent field penetration is key to causing excitation in the end pumped devices and is key in coupling the emitted light from the active medium into the waveguide. However, in multimode fibers only a fraction of the total input light power propagates in these higher order modes, so these devices amplify only a fraction of the total input light.

A single mode waveguide laser was taught by C. J. Koester in "Laser Action By Enhanced Total Internal Reflection" published in the IEEE Journal of Quantum Electronics, Vol. QE-2, No. 9, September 1966 at p. 580. There a passive (i.e., non-doped) core, monomode fiber was clad with neodymium doped cladding having an index lower than the core. The evanescent field of light travelling in the core excites the Nd atoms in the cladding in this device, and emitted light from the excited atoms bound in the cladding caused amplification manifested as a greater than unity reflection coefficient at the core cladding interface. This type of structure however has several disadvantages. First, the presence of the Nd atoms in the cladding causes the fiber to exhibit more loss because of absorption and scattering. Second, only one type of atom is present as the gain medium with only a limited number of electronic energy states. Thus, the wavelengths of light which can be absorbed and emitted is limited to a narrow range of wavelengths related to the energy gaps between the quantum energy states in the atom. Therefore, this device has a narrow useful bandwidth of frequencies which can be amplified.

An end pumped, single mode thin film waveguide dye laser with evanescent field pumping was taught in "Evanescent Field Pumped Dye Laser" by E. P. Ippen and C. V. Shank published in Applied Physics Letters, Vol. 21, No. 7 on Oct. 1, 1972, at p. 301. There a thin film monomode glass waveguide was deposited on a glass substrate, and doubled Nd:YAG laser pump radiation was end coupled into the waveguide by prism coupling. A dye chamber containing a lasing dye was sealed over the waveguide such that the evanescent field from the pump radiation excited the dye molecules lying near the surface of the film. The excited molecules then emitted light when they dropped back to lower energy states which light was coupled by evanescent coupling into the thin film waveguide.

A disadvantage with this thin film prism coupled type structure is the high coupling losses and alignment difficulties created by the prism coupling. Prism coupling causes losses at both ends of the thin film waveguide in launching light in the waveguide and in extracting the output light from the waveguide. Other means of coupling light into integrated optic thin film waveguide are available, but these other methods are also lossy.

Further, glass thin film waveguides are very lossy in terms of propagation losses because of the impurities which are added in the process of making the glass. These impurities cause stresses in the glass which generate absorption and scattering losses, especially where transition elements such as iron or copper are present as impurities. The traditional methods of making glass cause the presence of such undesirable impurities. Such losses are very undesirable for amplification and lasing applications.

The transverse pumped, end coupled devices described above also have the disadvantage that they generate a great deal of noise, because molecules of the active medium which are far away from the core are excited in addition to those molecules near the core. Only those molecules near the core contribute to the amplification, because the evanescent field of the signal to be amplified only penetrates a short distance into the active medium. Only those molecules within the reach of this evanescent field are stimulated to release light in phase with the signal to be amplified to add to the strength of this signal. The molecules outside the reach of the evanescent field absorb energy and do not release it in synchronization with the signal to be amplified, but they do release light energy spontaneously. Thus, these outer molecules waste pump energy. Further, the spontaneous emissions cause noise. That is, the portion of this spontaneously emitted light which is coupled into the waveguide appears as noise. This noise has foiled other workers in the art, because it tends to mask the amplified signal thereby leading these prior workers to believe that good signal to noise characteristics were not possible.

The nonrecirculating active medium embodiments also have the disadvantage that the active medium molecules or atoms eventually enter what is called the "triplet" state. The triplet state is an excited energy level which has a long lifetime. Electrons dropping from the triplet state to the ground energy state will not emit light, but instead they give up energy in the form of non-radiated energy. Because of the long lifetime in the triplet state, the population of molecules in this unuseable state increases over time where the excitation energy is continuous wave or where the excitation energy is comprised of pulses having a spacing which is shorter than the triplet state lifetime. Unless these molecules in the triplet state are swept away from the evanescent field region, the gain of the device will erode over time as the size of the triplet state population grows. Also, bleaching effects can occur.

Accordingly, a need has arisen for a light amplifier that has high gain, low modal dispersion and low loss, and which is easy to use and effective in monomode, fiber optic systems without excessive difficulty in coupling the amplifier into the circuit. Further, the amplifier should have a reasonably large bandwidth, and it should be capable of operating indefinitely without loss of effectiveness, and it should not require excessive pumping power. Further, it should provide a clean output which is free of excessive noise.

SUMMARY OF THE INVENTION

The invention is an apparatus and method for amplifying light. There is also disclosed a method for manufacturing the apparatus for amplifying light. The apparatus consists of a monomode, fiber optic waveguide having a portion of its cladding removed over a selected region to form a flat oval surface which is spaced from the core by a predetermined distance. An active medium such as a lasing dye is placed in contact with the oval surface of the fiber such that the evanescent field of light travelling in the fiber penetrates through the oval surface and into the dye. A sufficient amount of cladding is removed to cause a predetermined amount of absorption of energy from the evanescent field by the dye. The index of refraction of the dye is tuned to be a predetermined amount less than the index of refraction of the core so as to not substantially perturb the guided mode. In the preferred embodiment, the dye is flowed across the oval surface of the fiber, and the temperature of the dye is controlled to maintain the above index matching and tuning criteria.

The method of using the above apparatus to amplify light consists of end pumping the fiber with pump light at or near the peak absorption wavelength of the dye with a light source such as a laser. A probe signal to be amplified having a wavelength at or near the wavelength of peak light emission for the particular dye chosen is end coupled into the fiber at the same time or shortly after the pump signal is applied. The probe signal can then be separated from the pump signal at the output of the fiber by a suitable frequency selective device such as a prism. In the preferred embodiment, a lasing dye is continuously flowed over the surface of the fiber in the region where the cladding has been partially removed. The flowing dye is controlled in temperature such that its index remains substantially tuned at the predetermined point slightly less than the index of the core.

The method of maufacturing the amplifier apparatus consists of grinding or polishing a portion of the cladding of the fiber in a predetermined region to form a flat, oval surface, such that a reduced amount of cladding exist between the core and the flat surface of the cladding. The amount of cladding that is removed may be controlled by a technique called an oil drop test. Sufficient material is removed so as to tune the amount of radiated energy loss from the evanescent field of light propagating in the fiber so as to cause a 40–60 dB transmission loss through the fiber section with the reduced cladding. The 40–60 dB range is not critical to the invention, i.e., it is exemplary only. Any amount of penetration of the evanescent field into the active medium causing any radiative loss will cause some gain to occur. Whether that gain is useful depends upon the application.

After the portion of the cladding has been removed, a chamber or dye channel is sealed around the reduced cladding section of the fiber such that a lasing dye may be brought into contact with the fiber to produce the desired amplification. In some embodiments, the dye chamber may be filled before it is sealed around the section of fiber with the portion of cladding removed and in other embodiments a recirculating pump and temperature control unit is attached to the chamber so that temperature controlled dye may be recirculated through the chamber.

DETAILED DESCRIPTION OF THE PREFERRED EMBODIMENT

DETAILED DESCRIPTION OF THE PREFERRED EMBODIMENT

Figure 1:
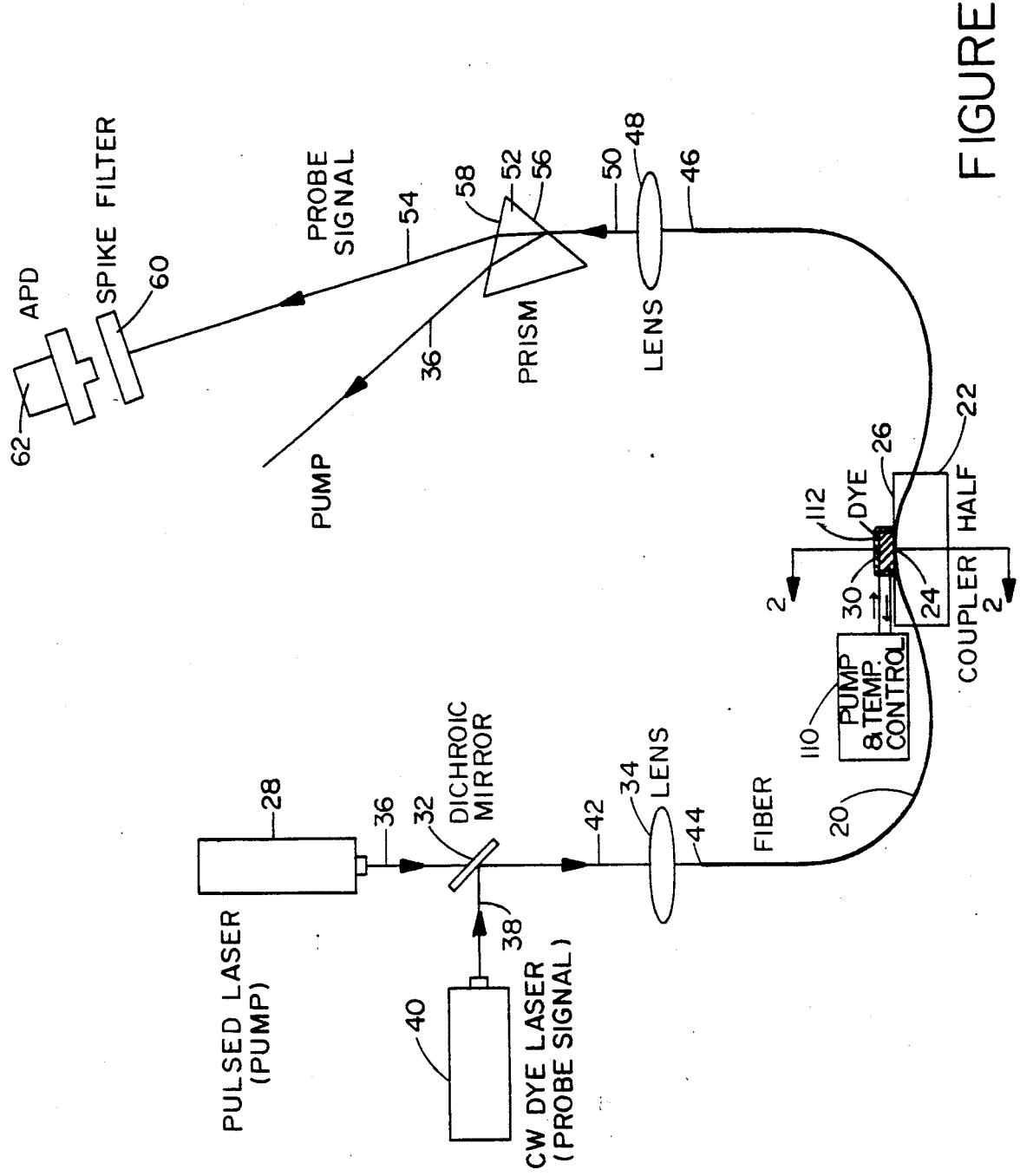
FIG. 1 is a drawing of the amplifier system of the invention.

Referring to FIG. 1 there is shown a drawing of the preferred embodiment of the invention and the dye amplifier itself. A monomode fiber optic waveguide 20 is mechanically affixed to a fiber holder 22. The purpose of the fiber holder 22 is to mechanically secure the fiber 20 and to expose a portion of the cladding of the fiber 20 for removal by polishing of the surface 26. In the preferred embodiment, the fiber holder 22 is one-half of a directional coupler the structure of which is well known in the art. Briefly, the structure is a quartz block having a groove formed therein of the approximate dimensions of the diameter of fiber 20. The groove is arcuate and has a radius of curvature which is large relative to the diameter of the fiber. The groove may be of a depth at the center 24 of the block 22 such that a portion of the cladding of the fiber 20 protrudes slightly above a flat surface 26 on the block. The fiber 20 may be glued into the groove with a suitable adhesive. The block 22 and the adhesive are preferably of the same approximate coefficient of thermal expansion and the same approximate hardness as the fiber such that polishing removes the cladding, the adhesive and portions of the surface 26 at approximately the same rate. A portion of the cladding may be then removed by polishing the surface 26. The amount of removal will be described below.

The fiber 20 has a core diameter of generally less than 10 microns, and it should be made of a relatively pure silica ($SiO_2$). It is especially desirable to use a fiber 20 with a very low concentration of the transition element such as iron and copper impurities as well as a very low concentration of any other impurities such as $OH^-$ ions. Such impurities cause stresses within the structure of the fiber which can cause absorption and scattering losses.

A pump light source such as the laser 28 provides a pump light signal. In the preferred embodiment the pump light is of a first predetermined wavelength matching the peak absorption wavelength of the active medium such as the lasing dye. The pump light is for supplying the excitation energy which will be required to excite the molecules of the active medium such as the dye solution 30 which is in contact with the surface of the fiber 20 near the center 24 of the coupler half 22 where a portion of the cladding has been removed. The pump light signal from the laser 28 is aimed through a dichroic mirror 32 into a lens 34. The dichroic mirror 32 is of a standard construction as is well known in the art. Its function is to pass the laser pump signal, symbolized by the line 36, through the mirror 32 and into the lens 34 with little or no transmission loss, but to substantially reflect a probe light signal to be amplified, symbolized by the line 38, such that all or substantially all of the light signal 38 is aimed into the lens 34 and is combined with the pump signal into a single collimated beam 42. Another highly desirable method of coupling involves use of a wavelength multiplexing directional coupler to combine both the pump and probe signals entering two ports of the coupler into a unified signal leaving one port of the coupler.

The probe signal on the line 38 is supplied by a CW dye laser 40. It is of conventional construction so long as it can supply a probe signal of a second predetermined wavelength which is tuned at or near the peak emission wavelength for the active medium. In the preferred embodiment, the second predetermined wavelength (compared to the pump wavelength) should be at or substantially near the wavelength of the emission peak for a dye solution 30 contacting the surface of the fiber 20 in the region where the portion of the cladding is removed. Likewise, the wavelength of the pump light signal 36 supplied by the pump laser 28 should be at or near the absorption peak of the dye solution 30 which is in contact with the region of the fiber 20 where the portion of the cladding is removed. As will be seen later, the absorption peak wavelength and the emission peak wavelength are not the same.

The pump laser 28 is pulsed in some embodiments especially where nonrecirculating dye is used as an active medium. However, the pump laser 28 could be a CW laser if the dye solution 30 were recirculated such that constantly new dye molecules were drawn into contact with the surface of the fiber 20 at the region where a portion of the cladding was removed. Laser dyes can enter what is called a "triplet" state which has a long lifetime and which is useless for lasing and amplification applications. More details on this triplet state will be given below. The pulsed laser 28 can be used with a static dye solution 30 if the time spacing between the pump pulses from the laser 28 is such that any molecules in the dye solution 30 which have dropped in energy to the triplet state have had time to decay back to the ground energy level prior to arrival of next pulse from the laser 28. Further, the pulse duration must be short enough that the triplet state does not become substantially populated during the pump pulse. Otherwise, the amplification would be less during later times in the pulse. Also, photo bleaching can occur in non-recirculating embodiments which can render them useless. Unfortunately, this limits the maximum pulse repetition rate at which pulses can be amplified since the probe signal can be applied only during the existence of a pump signal. If the pulse spacing from the laser 28 is too close together, the population of molecules in the dye solution 30 which are in the triplet state begins to grow. These molecules are useless for dye lasing or light amplification because, when they drop back to the ground energy level, no light is released, only other non-radiative forms of energy.

The lens 34 can be any lens which brings the beam 42 representing the combined probe signal 38 and the pump signal 36 to a focal point on the end 44 of the fiber 20. The lens 34 must bring the majority of the light in the beam 42 into the acceptance angle of the single mode of the fiber 20 to avoid substantial coupling losses.

Any other arrangement other than the laser 28, the laser 40, and the dichroic mirror 32 and the lens 34 can be used if arrangement can pump the fiber 20 simultaneously with the pump signal 36 and the probe signal 38. For example, if two lasers can be aimed or otherwise coupled into the fiber 20, then there is no need for the dichroic mirror 32 or the lens 34. Nor need the light sources be lasers. Any light source which can supply light of the proper wavelength for the pump signal and probe signal will be satisfactory. It is only necessary that two different light signals be coupled into the fiber 20 and that the wavelengths of these light signals be such that the wavelength of the pump signal be matched to the absorption peak of the dye and that the wavelength of the probe signal be matched to the emission peak of the dye 30.

Light amplification in the preferred embodiment occurs by virtue of the interaction of the evanescent fields of the pump signal 36 with the dye solution 30 to excite dye molecules and the interaction of the evanescent field of the probe signal with the dye molecules to stimulate emission of light. The combined pump signal 36 and the probe signal 38 in its amplified form are emitted from the end 46 of the fiber 20 and are collimated by a lens 48 into the combined beam 50. The beam 50 is separated by a prism 52 into a separate pump beam 36 and an amplified probe signal beam 54. The prism 52 performs this separation function because the combined beam 50 contains two signals at different wavelengths. These different wavelengths see different indexes of refraction in the prism 52, and they are therefore changed in their direction of propagation both at the air/glass interface 56 on the prism 52 and the air/glass interface 58 on the prism 52. The changed angles of the beams 36 and 54 result in a spatial separation of the pump signal 36 from the probe signal 54. The prism 52 should be a high dispersion material which provides maximum separation of the beams of different wavelengths.

A conventional spike filter 60 which has a reflective coating on one side and an absorption coating on the other side serves to pass only the probe signal frequency through it and to reflect all other frequencies. The spike filter 60 thus helps to filter out any noise at frequencies other than the probe signal frequency which would tend to mask the amplification effects of the dye solution 30. The amplified, filtered probe signal 54 is passed through to an avalanche photo detector 62 which is of conventional design.

Because the fiber 20 is a monomode, fiber optic waveguide several advantages result. First, the fiber can be easily fabricated into an existing fiber optic systems such as a signal processor or gyro without great difficulty. Known apparatus and methods for coupling energy into monomode fibers are available to patch the amplifier into other fiber optic systems. For example, the fiber 20 could be the fiber of a fiber optic recirculating delay line, and a fiber optic directional coupler could be used to multiplex the pump signal 36 into the fiber 20 which could be spliced into the delay line. The details of such a coupler are given in a co-pending U.S. Patent Application entitled "Fiber Optic Directional Coupler", Ser. Nr 139,551, filed Apr. 11, 1980, now issued as U.S. Pat. No. 4,493,528, and are available in a published scientific paper entitled "Single Mode Fiber Optic Directional Coupler" by R. A Bergh, G. Kotler and H. J. Shaw, published in Electronics Letters, Vol. 16, No. 7, Mar. 27, 1980. The details of other acceptable couplers or other apparatus which could be used to couple the pump signal 36 and the probe signal 38 into the fiber 20 are well known in the art.

A further advantage of using a monomode, fiber optic waveguide 20 is that it is a very low loss medium. If the fiber is substantially pure, i.e., there are few impurities in the silica material which makes up the fiber core and cladding, then very little absorption loss occurs during propagation of light through the fiber. Further, monomode fiber supports only one mode of propagation. Therefore, there is no modal dispersion suffered by light signals which propagate through the fiber 20. As is well known in the art, dispersion effects result in a smearing or spreading out of light pulses whose components travel different path lengths. This is because the different component travel at different speeds by virtue of propagation in different modes having different path lengths. Because the path length for each mode is different, the light traveling in each mode has to travel further than light traveling in another mode resulting in different arrival times for light components which started out at the same time. Monomode fiber eliminates this problem. Thus, shorter pulses can be used with many different frequency components without degradation of the pulse in travelling through the fiber of the amplifier.

In contrast to fiber optic waveguides, integrated optics waveguides have much higher transmission losses for light propagating through them. The losses for integrated optics waveguides are measured in terms of decibels per centimeter as opposed to losses for monomode, fiber optic waveguides which are measured in terms of decibels per kilometer.

A further advantage of using monomode, fiber optic waveguides is that all the guided energy is contained in one mode which has an evanescent field extending into the cladding. Because this evanescent field is key in causing the excitation of the active medium such as the dye molecules, only modes which have an evanescent field which extend into the active medium can be amplified. That is, the evanescent field for an end pumped amplifier is what causes the molecules in the active medium to be raised to higher energy level states. The evanescent field of the probe signal is the coupling mechanism which stimulates the in phase emissions from these excited molecules and which couples the emitted light back into the waveguide. Obviously, if a multimode fiber optic waveguide is used, only those modes which have sufficient evanescent field penetration into the active medium will be amplified. However, only the higher order modes have substantial penetration by the evanescent field into the active medium. Therefore only these higher order modes will be amplified and the lower order modes will not be amplified. Therefore not all the energy in a signal propagating through a multimode fiber will be amplified since only a fraction of the total signal energy is carried in the higher order modes. This results in a lower overall gain for multimode fiber optic amplifiers.

Figure 2:
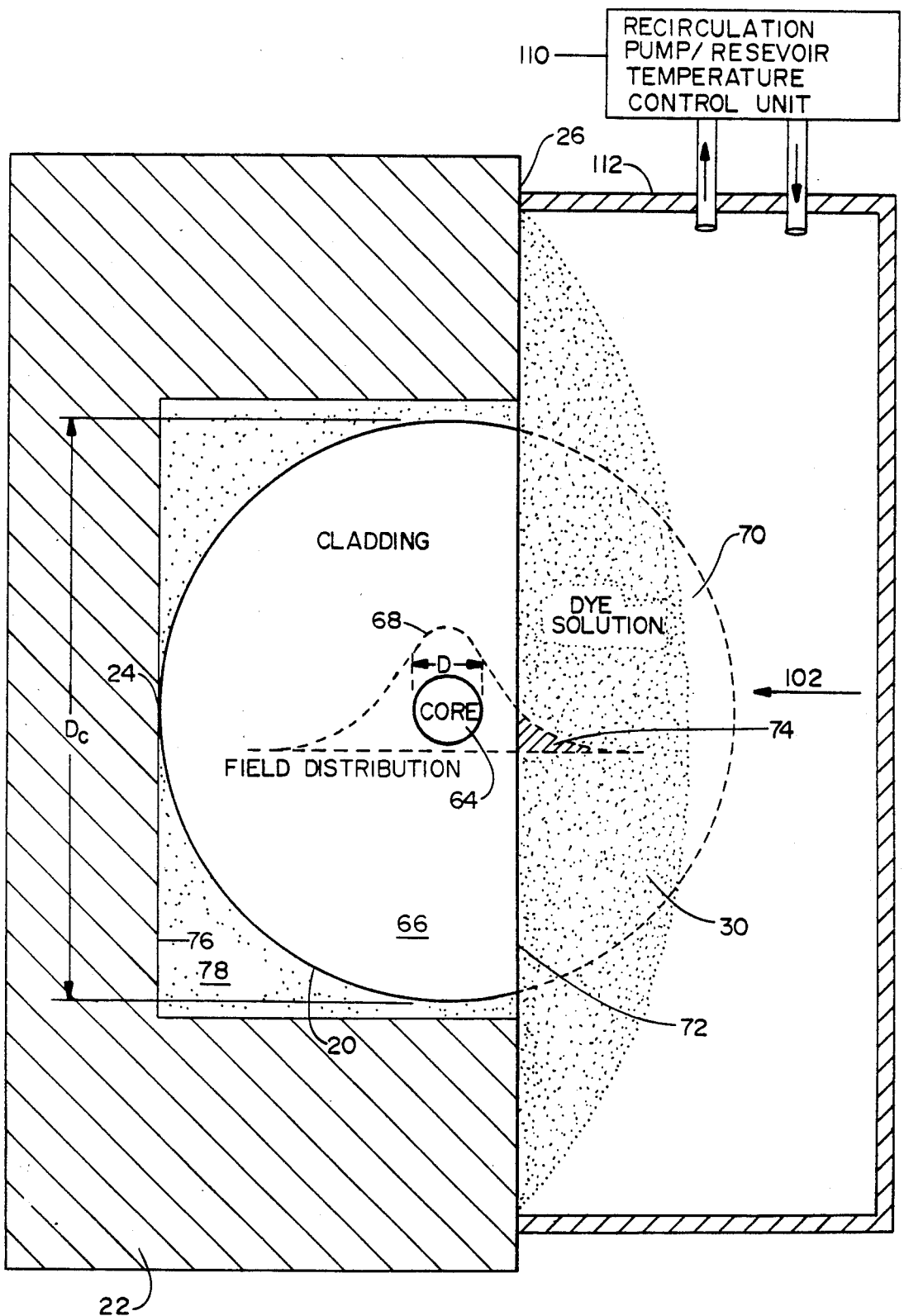
FIG. 2 is a cross sectional view of the fiber 20 taken along the view line 2—2 in FIG. 1.

Referring to FIG. 2 there is shown a cross-sectional view of the fiber 20 taken along the view line 2—2 in FIG. 1. FIG. 2 shows the relative electric field distribution of the light wave traveling in a core 64 of the fiber and its relationship to the cladding 66 and the dye solution 30. The diameter of the core 64 is selected to support only one mode in the wavelength range of the pump signals 36 and the probe signal 38. Generally this diameter is less than 10 micrometers. The electric field distribution in the fiber 20 is represented by the dashed line 68. The mathematical derivation of the field distribution 68 is well known in the art and involves solutions to Maxwell's equations. Many variables are involved, and no attempt will be made here to mathematically characterize the field distribution as this derivation is well known in the art.

The portions of the curve 68 outside the diameter D of the core 64 represent the evanescent field in the cladding 66 and the dye solution 30. The amount of penetration of the evanescent field into the cladding generally becomes greater as the diameter D of the core 64 becomes smaller. Thus, in monomode fibers having core diameters of 10 micrometers or less, there is more evanescent field penetration into the cladding than in multimode fibers with cores on the order of 50 to 60 micrometers in diameter. Therefore, monomode fibers work better for light amplification devices using evanescent pumping and evanescent coupling of the emitted light energy into the core because of the greater penetration of the evanescent field into the cladding.

It can be seen from FIG. 2 that a portion 70 of the cladding 66 has been removed. This portion of cladding 70 can be removed by any method which can precisely control the amount of cladding removed. It is important that precise control over the amount of cladding removed be maintained so that the core 64 not be exposed. The amount of cladding which is removed is determined by the amount of evanescent field that extends past the surface 72 into the active medium.

The dye solution 30 is placed in contact with the surface 72 of the fiber 20 such that a portion of the evanescent field, represented by the cross hatched area 74, extends into the dye solution. The amount of cladding 70 that is to be removed is established, as will be described in more detail later, by ascertaining the amount of penetration of the evanescent field past the surface 72 as evidenced by the loss of light energy travelling through the fiber 20. A relatively high transmission loss on the order of 40 to 65 dB is desirable, because it indicates that a relatively substantial penetration of the evanescent field past the surface 72 has occurred. However, if too much cladding is removed such that the surface 72 touches the outer perimeter of the core 64 or penetrates the outer perimeter, very high and unacceptable losses will result. These losses result from mode perturbation.

Figure 3:
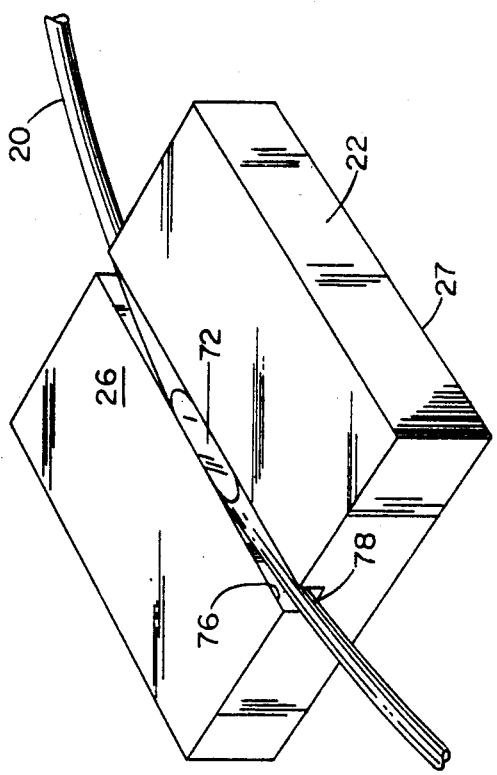
FIG. 3 is a perspective view of the fiber holder of the amplifier.

Referring to FIG. 3 there is shown a perspective view of the fiber holder 22 in FIG. 1. In the preferred embodiment, the fiber holder is comprised of a rectangular base or block 22 with a single mode, fiber optic waveguide mounted in a longitudinal, arcuate groove 76. The groove 76 is formed in the block 22 prior to grinding and optical polishing of the surface 26. The fiber 20 comprises a commercially available fiber of quartz glass which is doped to have a central core (not shown) and an outer cladding. The diameter of the cladding, $D_c$ in FIG. 2, is on the order of 100 microns.

The groove 76 has a radius of curvature of approximately 25 centimeters, and it has a width slightly larger than the fiber diameter. Thus, when the fiber 20 is mounted in the groove 76, the fiber conforms to a path defined by the bottom surface of the groove 76. The depth of the groove 76 varies from a minimum at the center 24 to a maximum at the edges 78 of the block 22. The shape of this groove allows the fiber optic waveguide 20, when mounted in the groove 76, to gradually converge toward the center 24 of the block and to diverge toward the edges 78 of the block 22. This eliminates any sharp bends or abrupt curves in the direction of the fibers 20 which could cause power loss through mode perturbation, i.e., radiation losses caused when the angle of incidence of light waves travelling in the core of the fiber 20 exceed the critical angle at the core/cladding interface, thereby causing some energy to be transmitted through the core cladding interface and lost to radiation. It also prevents the fiber from breaking during polishing since the fiber ends are below the quartz surface being polished. In FIGS. 2 and 3, the groove 76 is shown as rectangular in cross section, but it will be understood that the groove 76 could have any other suitable cross section such as a U-shape or a V-shape. Techniques for forming the groove 76 are well known in the art.

At the center 24 of the groove 76, the depth of the groove is less than the diameter $D_c$ of the fiber 20, while at the edges of the block 22, the depth of the groove 76 is preferably at least as great as the diameter $D_c$ of the fiber 20. Because a portion 70 of the cladding must be removed, the extension of the surface of the cladding above the surface 26 of the fiber holder 22 makes it easy to remove this portion of the cladding. This is done by securing the fiber 20 in the groove 76 by a suitable adhesive such as epoxy illustrated at 78 in FIG. 2 and polishing the surface 26 until the proper amount of cladding has been removed. It is also possible to make the groove depth at the center 24 equal to the diameter of the fiber. In this case, the portion 70 of the cladding to be removed will have to be removed by simultaneously polishing the fiber with the entire surface 26 until the required amount of cladding has been removed. Since only a few microns of cladding need be removed, this polishing method allows for good precision and control.

The polishing of the surface 26 forms the oval, planar surface 72 on the fiber 20. The surface 72 can be brought closer to the core 64 by continued polishing of the surface 26 until a sufficient amount of material of the surface 26 and a corresponding amount of material in the cladding 66 has been removed. However, once too much material has been removed, i.e., the surface 72 approaches too close to the core 64, it is not possible to add cladding material back onto the fiber 20, and the fiber 20 and the fiber holder 22 may be useless for amplification purposes.

It will be noted from the above procedure that a tapered removal of the fiber optic cladding 66 results. This tapered removal of the cladding avoids backward reflection caused by an abrupt boundary change or discontinuity, and it thereby avoids excess loss of light energy.

It is seen from FIG. 2 that the evanescent field outside the diameter of the core 64 decreases rapidly with distance into the cladding. Enough cladding material 70 must be removed such that the evanescent field portion 74 extends substantially into the dye solution 30 with sufficient field strength to cause a sufficient amount of excitation of the molecules of the dye solution 30. To determine how much cladding material should be removed from the surface 26 to accomplish this result, an oil drop test is used.

Figure 4:
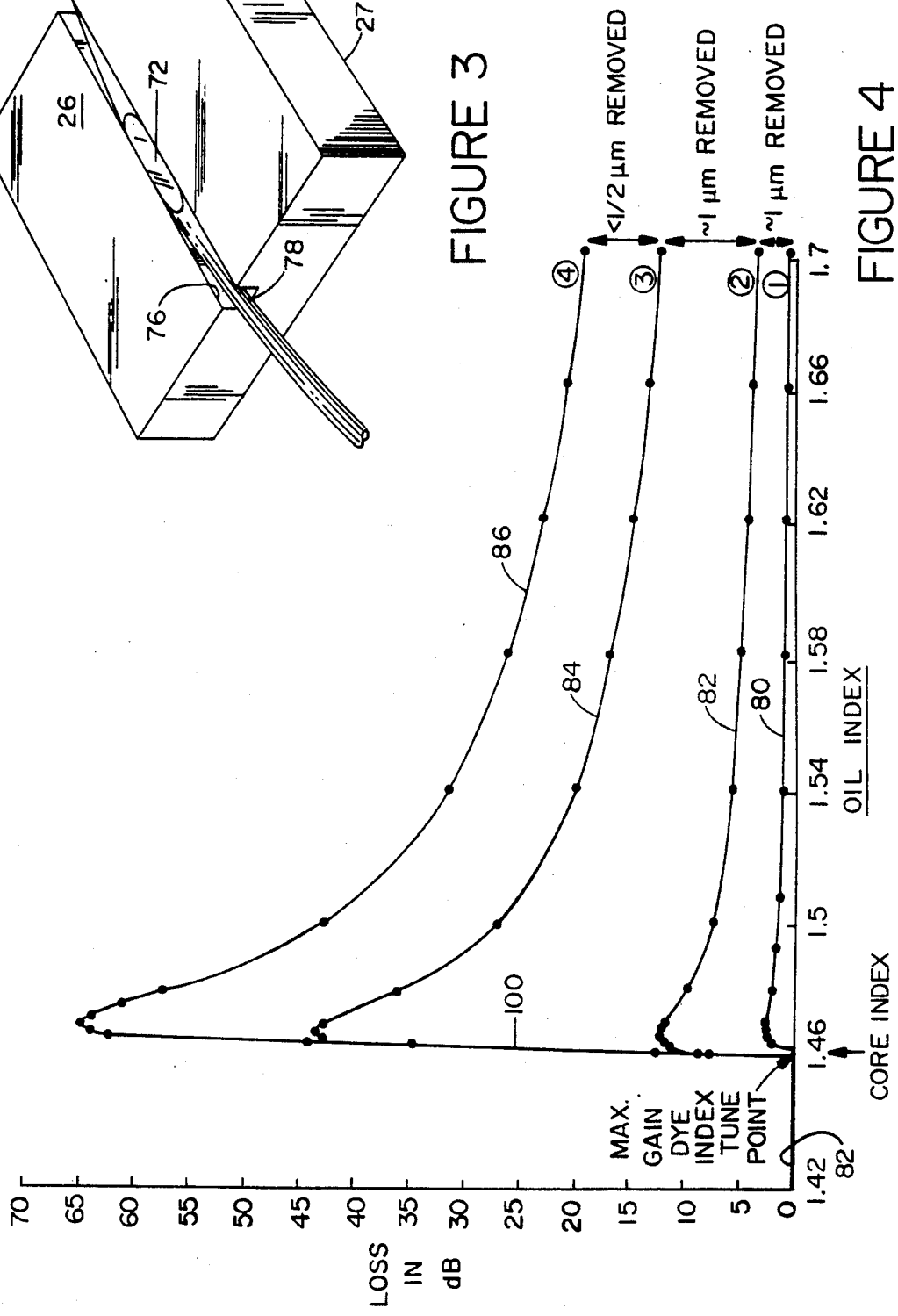
FIG. 4 is a graph of oil drop test results to determine the proper amount of cladding to remove.

Referring to FIG. 4, there is shown a series of curves 80, 82, 84, 86, each of which represents a different amount of removal of the cladding portion 70, i.e., a different closeness of the surface 72 to the core 64. The curves plot radiation losses as a function of the index of oil placed on the cladding portion 70. Such losses are indicative of the extent of penetration of the evanescent field 74 (FIG. 2). FIG. 4 was derived by measuring the amount of light output from the fiber 20 for a given amount of input power when oil drops having different indexes of refraction are placed on the surface 72 as compared to the light power transmitted in the absence of an oil drop. The test results illustrated in FIG. 4 were obtained using a six-micrometer core Corning glass fiber with the radius of curvature of the half coupler groove 76 set at 25 cm. The wavelength of the light was 1.064 micrometers and the input power was 0.7 mW.

The curve 80 illustrates the initial step with a small amount of the cladding portion 70 removed. The index of the core of the particular fiber used in the test was approximately 1.46. As is well known in the art, when the cladding index is slightly below the index of the core, then complete internal reflection with little or no loss will occur. This corresponds to the region on the horizontal axis between the index 1.42 and the index 1.46 designated by the reference numeral 82 in FIG. 4. For oil drops having an index of refraction in the range 82, no loss is experienced since total internal reflection occurs. As the index of the oil drop approaches the index of the core, no loss occurs until the index of the oil approximately reaches the index of the core. This phenomenon is shown by the upward transition line 100 around the index valve 1.46 in FIG. 4. The curve 80 illustrates that for a small amount of cladding removed, the losses for oil drop index values of 1.46 and higher never exceed approximately 3 decibels. The losses peak at index values slightly greater than 1.46, and then become slightly less for higher index values. These losses result from the penetration of the evanescent field 74 (FIG. 2) past the surface 72 resulting in radiation loss. Since the curve 80 represents a removed portion 70 of the cladding which is small, it corresponds to a surface which is farther to the right than the surface 72 shown in FIG. 2, so that the portion 74 of the evanescent field distribution curve 68 extends out of the cladding by only a small amount.

The curve 82 in FIG. 4 represents the losses experienced when approximately one more micrometer of cladding portion 70 is removed. This corresponds to a surface which is leftward, toward the peak of the evanescent field curve 68, relative to the surface for the curve 80. As will be seen from inspection of FIG. 2, a leftward movement of the surface 72 toward the core results in more evanescent field strength outside the fiber surface 72 because the strength of the evanescent field at the surface 72 increases as the surface 72 gets closer to the core 64. As the index of the oil drop on the surface 72 is increased until it matches or slightly exceeds the core index, the losses increases to approximately 12 or 13 dB. For oil drops with higher index values, the losses decrease with a loss of 5 dB characteristic for an oil of index 1.7. Ideally, for maximum amplification, the amount of evanescent field 74 in FIG. 2 extending past the surface 72 should be maximized, and the cladding portion 70 which is removed should be large enough such that the surface 72 is close enough to the core to result in a loss of between 40 and 65 dB for an oil index of 1.46 or slightly higher. The curves 84 and 86 in FIG. 4 respresent acceptable positions for the surface 72 relative to the core 64 for adequate amplification when a dye solution 30 is placed on contact with the surface 72.

The difference between the curve 80 and the curve 82 in FIG. 4 is approximately 1 additional micrometer of cladding removed, i.e. the surface 72 in FIG. 2 is approximately 1 micrometer closer to the core 64. Likewise, the difference between the curves 82 and 84 represents approximately 1 additional micrometer of cladding portion 70 removed. However, it is apparent from FIG. 4 that for the curve 84, the losses for an oil index of slightly above 1.46 are 45 dB which is more than three times the loss found on the curve 82 for an oil drop of the same index. This non linear phenomenon results from the bell shaped distribution of the magnitude of the electric field illustrated by the curve 68 in FIG. 2. That is, as the surface 72 approaches closer to the core 64 in equal increments of distance the amount of loss increases by a substantially greater margin for each additional increment.

No absolute value for the distance of the surface 72 from the core can be specified, because the amount of evanescent field extending past the surface 72 depends upon the wavelength of the light in the core as well as the core diameter and the relative indexes of the core 64, cladding 66, and the active medium 30.

Care should be taken not to polish so far that the surface 72 comes into contact with the core 64.

Figure 5:
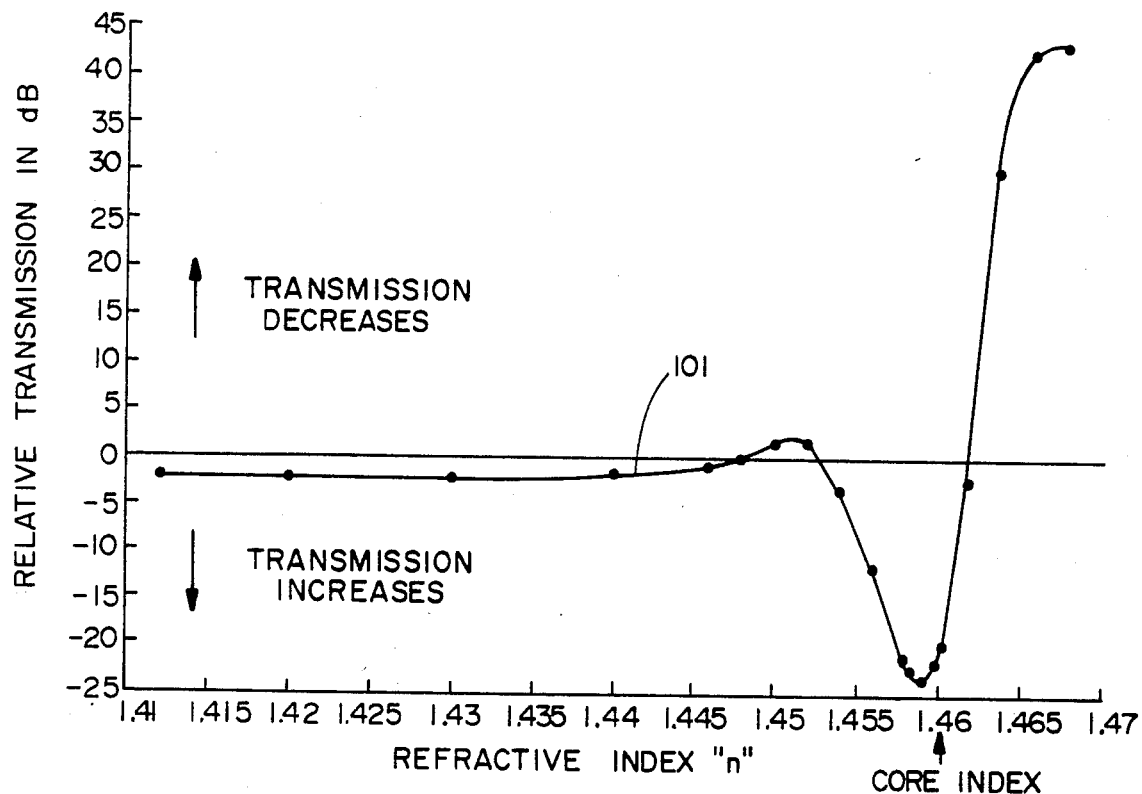
FIG. 5 shows the effect of polishing into the core upon transmission losses.

FIG. 5 shows the effect of polishing into the core upon transmission losses. FIG. 5 represents the situation wherein a 6 micrometer core, monomode, fiber optic wave guide carrying light of wavelength 1.064 micrometers in a half coupler as shown in FIG. 3 had too much cladding removed, such that the core 64 was exposed. The graph of FIG. 5 represents the normalized transmitted power past the exposed core region when oil drops of varying index were placed on the surface 72 as normalized by the transmitted power for no oil on the surface 72, i.e. an air/glass interface. The negative dB scale indicates transmission of power is increasing relative to the transmitted power for the air/glass interface, whereas the positive dB scale indicates that the transmitted power with the oil drop on the surface 72 is decreasing relative to an air/glass interface. The curve 101 of FIG. 5 shows that there is not much relative change between the air/glass interface transmission and transmission with an oil drop present for oil drops having index values ranging between 1.41 and 1.45. Indeed almost all the light is lost for this range either with air or glass at the interface. That is, the points on the curve represent the power transmitted with oil at each index present on the exposed core versus the power trasmitted in the absence of the oil. However, for index values of oil between 1.45 and 1.46 a marked increase in transmission with the oil drop present occurs. This is because the oil drop acts to replace the missing cladding when it has an index slightly less than the core index, i.e., about 1.46. That is, the oil drop seems to replace the lost cladding and causes increased internal reflection thereby eliminating transmission losses and increasing the throughput power which is able to propagate past the section of the fiber where the cladding portion is removed. However, as the oil drop index was increased beyond 1.46, a marked decrease in the amount of power transmitted past the removed cladding region occurred. This resulted from transmission losses wherein light escaped the core because of the higher index of the oil drop compared to the index of the core and was lost into space by radiation. A dye amplifier could be made in monomode fiber with all the cladding removed and the core exposed in a region, if the index of the dye is carefully tuned and controlled to remain in the region just lower than the core index of 1.46.

It should be noted that the experimental results illustrated in FIGS. 4 and 5 are dependent upon the wavelength of the light in the fiber, the diameter of the core, the material, and quality of the fiber optic wave guide, the indexes of the core and cladding of the fiber optic wave guide and of the oil, and the radius of curvature of the groove in the fiber holder 22. All these factors play a role in determining the losses in the fiber and the amount of penetration of the evanescent filed past the surface 72. However, FIGS. 4 and 5 do illustrate generally the principles upon which the dye amplifier is based.

Figure 6:
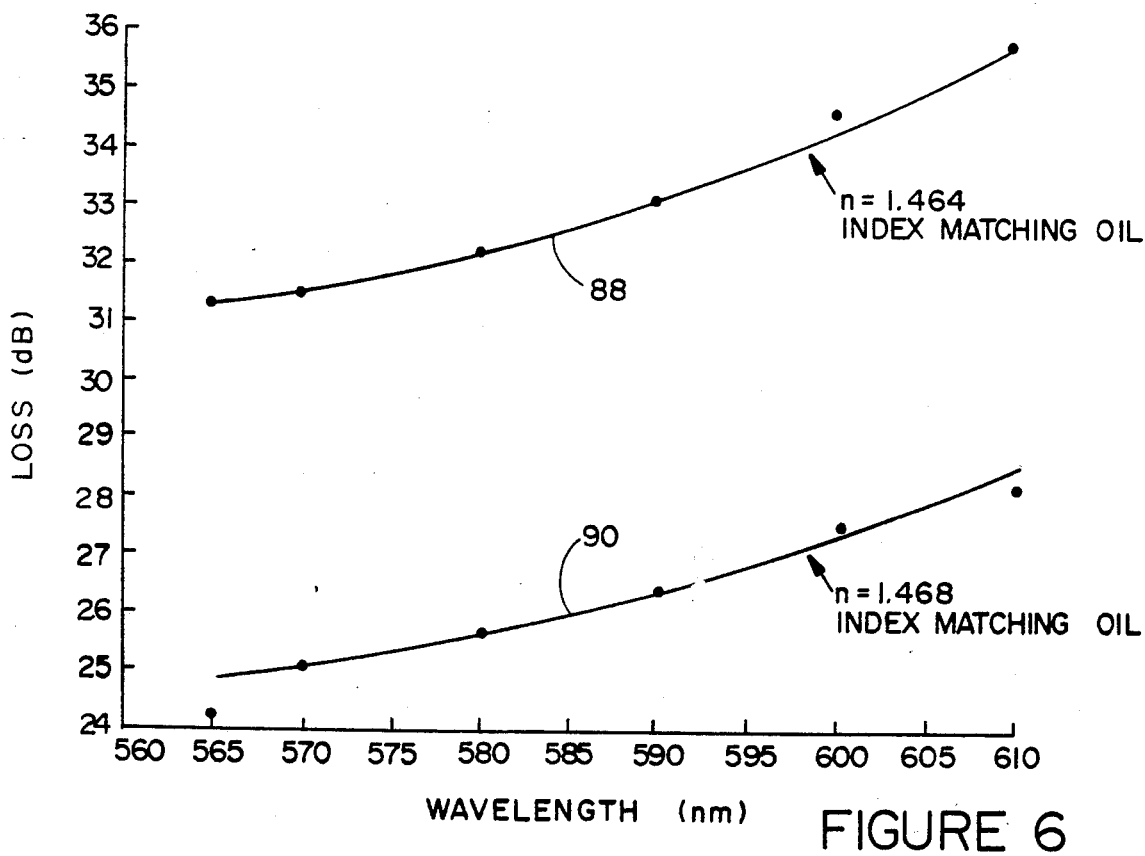
FIG. 6 illustrates the wavelength dependence of the penetration of the evanescent field into the cladding.

Referring to FIG. 6, there is shown a graph of the wavelength dependence of the penetration of the evanescent field into the cladding. FIG. 6 is drawn down in terms of radiation loss versus wavelength. The data of FIG. 6 was obtained by using the half coupler illustrated in FIG. 3. The data was obtained by placing a drop of index matching oil having an index of 1.464 on the surface 72 to obtain the curve 88 and by placing an index matching oil drop having an index of 1.468 on the surface 72 to obtain the curve 90. The wavelength of the input light was then varied between 565 nm and 610 nm, and the amount of radiation loss with the oil present relative to the radiation loss in the absence of the oil was measured. The ratio was expressed in terms of decibels. It is seen from FIG. 6 that the longer wavelengths have larger losses indicating a greater penetration of the evanescent field past the surface 72 into the index matching oil.

The amplification that occurs in the light amplifier of the invention occurs when a lasing dye solution 30 is placed in contact with the surface 72 and the dye molecules are excited to higher energy level states by the evanescent field of the pump light signal 36. After the dye molecules are excited, stimulated emission is caused by the evanescent field of the probe signal 38 stimulating the excited dye molecules to make downward energy transitions and to release coherent photons having a wavelength exactly matched to the wavelength of the probe signal 38.

Figure 7:
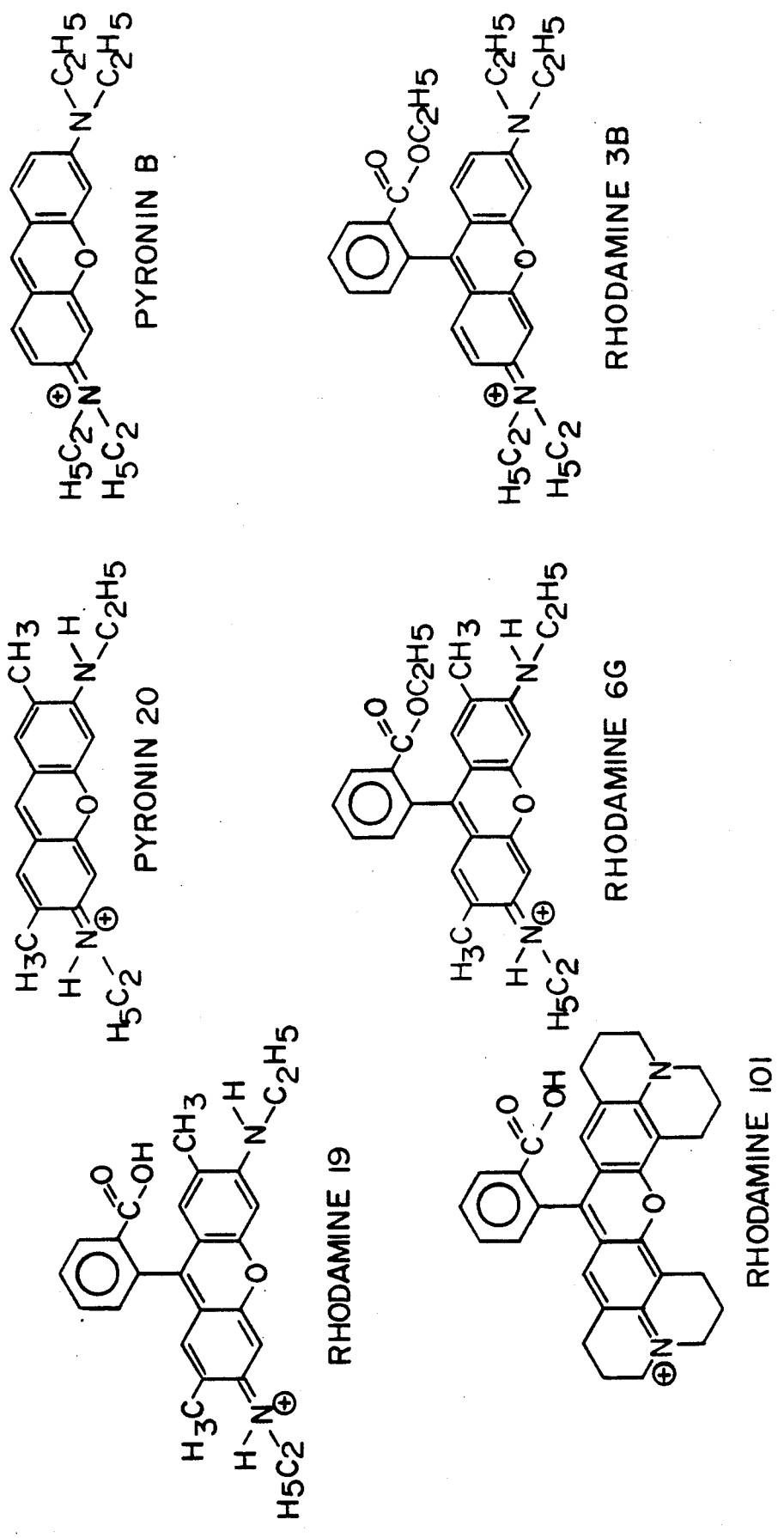
FIG. 7 illustrates some of the chemical structures for dyes that are suitable for lasing and light amplification.

FIG. 7 illustrates the chemical structure of some Rhodamine lasing dyes which are suitable for light amplification. There are other dyes which are suitable for this purpose, and the chemicals structures shown in FIG. 7 are intended to be illustrative only. The particular dye selected for the preferred embodiment is Rhodamine B, but Rhodamine 6G would also be acceptable. The acceptability of a particular dye for amplification and lasing depends upon the wavelength for the pump signal and the wavelength for the probe signal that must be amplified. The dye should be chosen such that its peak absorption wavelength substantially matches the wavelength of the pump signal and so that the peak emission wavelength substantially matches the wavelength of the probe signal to be amplified. Atoms, molecules and crystals absorb and emit electromagnetic waves in the form of light of a characteristic wavelength. According to the theory of quantum mechanics, the internal energy of an atom, molecule, or a crystal can have only certain discrete values, which are called quantization levels. When an electron makes a transition from an energy level $E_2$ to a lower energy level $E_1$, light having a frequency proportional to the energy difference $E_2 - E_1$ may be absorbed or emitted. Energy can also be exchanged in other ways besides emission or absorption of light. If h is Planck's constant, then the frequency of the emitted light is given by the expression of equation (1) below.

$$f_0 = (E_2 - E_1)/h \quad (1)$$

Where $F_0$ is in Hertz. Equation (1) represents the Bohr condition.

Figure 9:
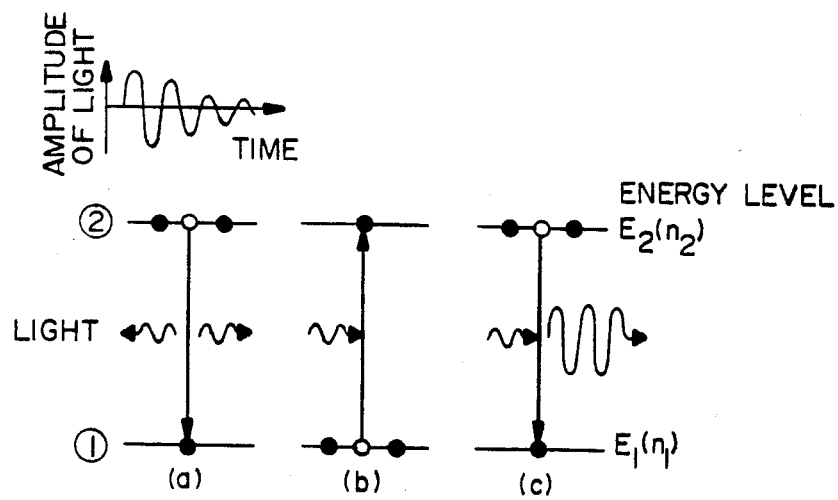
FIGS. 9 (a)–(c) illustrates the processes of absorption, spontaneous emission and stimulated emission occurring during changes in quantization levels.

There are several ways that an atom, molecule or semiconductor can absorb or emit light as a result of a transition between two quantum energy states. Referring to FIGS. 9(a) through (c), there is shown a schematic representation of these several energy absorption and emission phenomena. FIG. 9(a) illustrates the situation when an atom or molecule is initially in a higher energy level $E_2$ and spontaneously drops to a lower energy level $E_1$ thereby emitting light of a frequency $f_0$ randomly without any external light or triggering mechanism being present. This process is called spontaneous emission. When a large number of atoms or molecules in the upper energy state $E_2$ are initially present, the phases of the waves radiated from the various atoms or molecules during their downward transitions are independent. That is, the emitted light is incoherent and random in direction of propagation.

FIGS. 9(b) and (c) illustrate two options in the other transition process which can occur when an incident photon of frequency $f_0$ or very close to $f_0$ is pumped into the atom or molecule from an external source. The first possibility is illustrated in FIG. 9(b) which illustrates absorption of the photon of the input light causing excitation of the electrons of the atom or molecule from energy level $E_1$ to energy level $E_2$. This process is called resonant absorption.

The other possibility in this situation is illustrated in FIG. 9(c). There the atom or molecule is initially in energy level $E_2$ when the photon of frequency $f_0$ arrives. The arriving photon induces the excited atom or molecule to emit a photon of light having the same phase and the same frequency as that of the input light. The probability of this emission is proportional to the intensity of the input light photon. This process is called stimulated emission; and it forms the basis of laser operation and light amplification.

Referring again to FIG. 8 there is illustrated the energy levels of real dyes used for dye lasers and dye light amplifiers. The situation is slightly more complicated in real dyes because more than two energy levels are involved because of the many atoms which make up the molecules. The ground energy state is indicated by the letter G. Actually it is the band of energy states represented by the ground states for the various atoms comprising the molecule of the dye. Absorption of energy from the evanescent field portion 74 in the dye solution illustrated in FIG. 2 can occur between two different energy levels or bands indicated by the states S1 and S2 in FIG. 8. The energy band represented by S2 is the principal pump band to which the majority of the dye molecules are excited by the evanescent field of the pump signal 36. This absorption is represented by the solid line 92 from the ground energy state G to the pump band S2. A minor absorption phenomena at a different wavelength occurs between a ground state G and a first energy level S1.

The S1 state is a band of energy levels designated as the metastable state for the dye molecules. Dye molecules excited into the S2 pump band almost immediately decay back down to the S1 metastable state giving off non-radiative energy, as represented by the dashed line 96 in FIG. 8. The lifetime for the excited molecules in the S2 pump band is very short, and is on the order of picoseconds. On the other hand, the lifetime for the excited dye molecules in the S1 metastable state is on the order of nanoseconds. It is the metastable states which are useful since every molecule which decays from the S1 metastable state back to the ground state releases a photon having a wavelength consistent with the energy gap between the S1 state and the ground state. This emission is represented by the solid line 98. It is the downward transitions represented by the line 98, when stimulated by an incoming photons having a wavelength approximately equal to the wavelength of the light emitted in this downward jump, which is at the heart of the amplification of the invention. Maximum gain will be found when the maximum number of dye molecules possible are excited by the evanescent field of the pump signal to the metastable states.

Therefore, maximum gain occurs when the evanescent field portion 74 in FIG. 2 extends substantially into the dye solution 30. This penetration can be maximized by carefully tuning the index of the dye solution to be at a level just below the index of the core or 1.46 in the specific example described herein. This maximum gain dye index tuning point is illustrated in FIG. 4 as a point at the base of the vertically rising line 100 where the oil drop index matched the index of the core. When the dye solution is tuned to this index point just less than the index of the core, the dye appears to the mode travelling in the fiber core 64 as cladding because the cladding portion 66 and the removed portion 70 both have indexes slightly lower than the core index. Therefore, minimal mode perturbation is achieved when the dye solution index of refraction is kept tuned to the maximum gain point illustrated in FIG. 4 and this is also the point of maximum penetration of the evanescent field 74 into the dye solution 30. Since the extent of the evanescent field penetration into the cladding depends upon many factors including the dimension of the core 64, the wavelength of the light propagating in the core, the closeness of the surface 72 to the core, and the relative indexes of the core 64, and the cladding 66 and the dye solution 30, any combination of the above parameters which will yield sufficient penetration of the evanescent field into the dye solution 30 to yield 40 to 65 dB of loss for the oil drop test results indicated in FIG. 4 will be adequate.

As noted above, the dye solution index must be carefully controlled to achieve maximum gain. This is done by controlling the temperature of the dye solution and by selecting certain solvents to dissolve the dye powder, said solvents being mixed in the proper proportion. The table of Appendix A gives the types of solvents which can be used for various dye powders which are commercially available for dye laser and amplification devices. The far right columns indicate the wavelengths for absorption peaks and the wavelength for emission peaks for the various solvents listed. That is, the column labeled $\lambda_{ABS}$ indicates the maximum wavelength of the main absorption band for that particular solvent and that particular dye powder. The column labeled $\lambda_{LAS}$ gives the approximate lasing wavelength for a flash lamp pumped solution.

Figure 8:
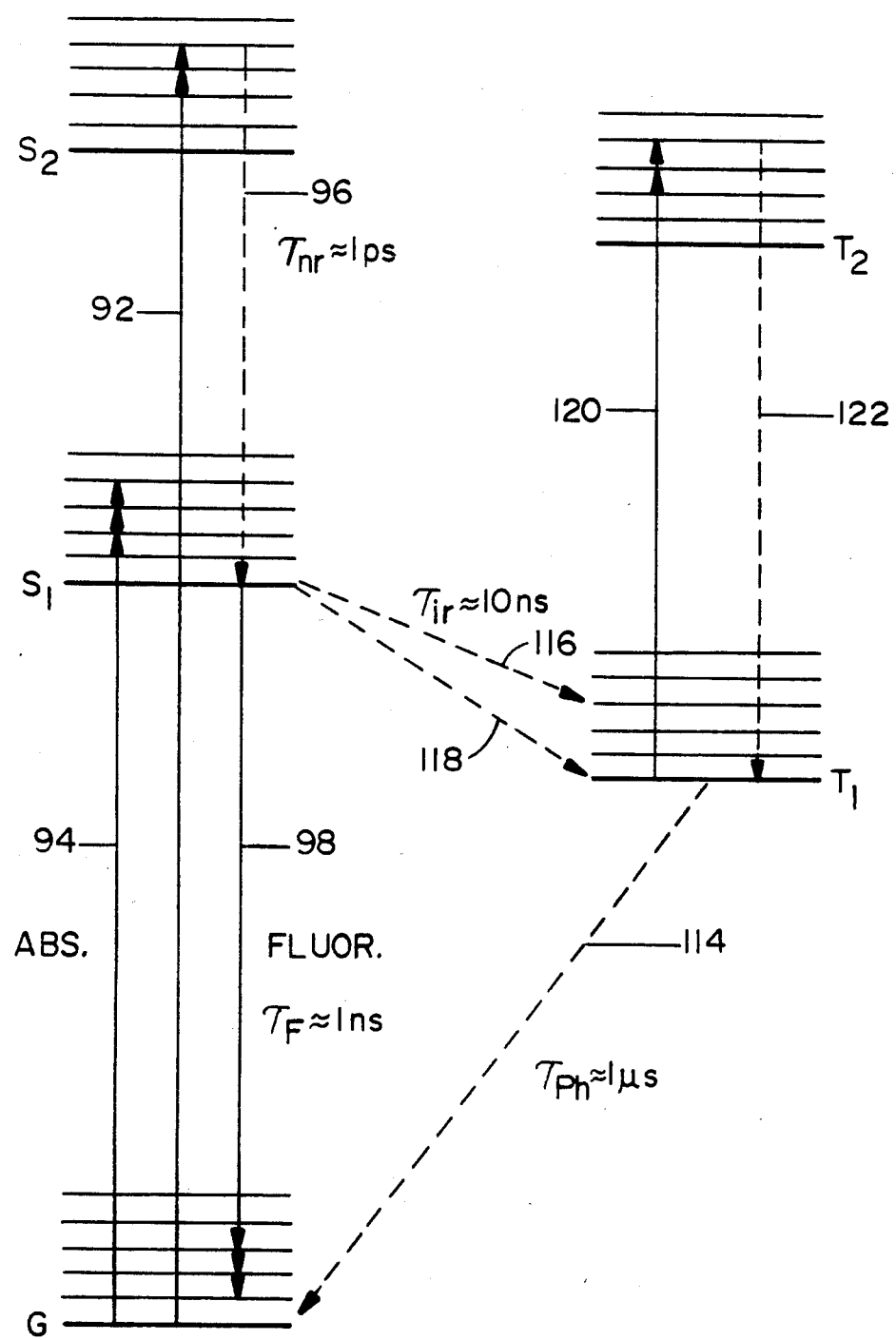
FIG. 8 illustrates the energy levels of a typical molecule of dye such as is shown in FIG. 7.

The stimulated emission photons represented by the transition line 98 in FIG. 8 are coupled into the core 64 by evanescent coupling. That is, the photons are emitted in phase with the incoming photon, and they raise the amplitude of the light in the entire mode. Any dye molecules which spontaneously emit light other than by stimulated emission will emit photons of random phase and direction relative to the incoming signal. These photons will be captured in the core 64 and will appear in the output as noise only if their direction of propagation is within the acceptance angle of the guided mode as is well known to those skilled in the art. All other photons will radiate away and not be found in the output signal. The end pumping scheme for excitation of the dye solution molecules gives rise to a cleaner output signal having less noise because of the foregoing fact. That is, for transverse pumping where pumping energy would be directed into the dye solution from a point external to the fiber core 64, for example, from the direction of the arrow 102 in FIG. 2, excitation of many dye molecules which are outside the reach of the evanescent field of the probe signal would be caused. These dye molecules could spontaneously emit photons during the time the evanescent field of the probe signal is passing through the dye solution. Because there will be many of these excited dye molecules outside the range of stimulated emission of the evanescent field of the probe signal, the chances of many more of these spontaneously emitted photons being captured within the aperture angle of the guided mode is much higher. This creates unwanted noise, and can mask the amplification effects of the evanescent field coupling the stimulated emissions into the guided mode. Normally, the evanescent field extends only a very short distance into the dye solution 30 such that the majority of the dye solution is outside the range of the evanescent field coupling.

If the dye molecules outside the range of the evanescent fields are excited, more noise from spontaneous emission will result. Therefore, it is desirable to excite only those dye molecules within this very small evanescent field penetration distance from the surface 72 such that there are not as many dye molecules outside the range of evanescent field coupling which are excited which can spontaneously emit light to cause unwanted noise.

Figure 10:
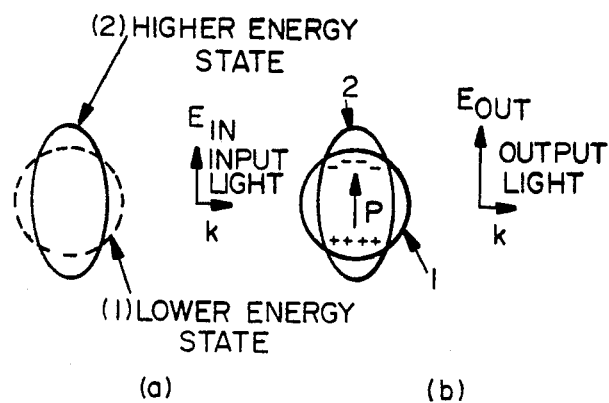
FIG. 10 illustrates the mechanism of amplification by stimulated emission.

FIG. 10 illustrates the mechanism for amplification by stimulated emission. FIG. 10(a) illustrates the energy states of the excited dye molecules symbolically when there is no input signal or probe light present. In such a situation the wave function representing the state of an electron for the higher energy level 2 is independent of the wave function for the lower energy level 1. FIG. 10(b) represents the case where an external stimulus such as an input light photon is present. In this situation the two wave functions are no longer independent, but the state of the excited atom must be represented by the convolution of the two wave functions. That is, there is spacial interference (beating) between the two functions. Therefore the electric charges are polarized in the direction of the electrical field of the input waves, and, thus, the electric charge distribution oscillates with the same phase as that of the input wave. Thus the atom itself acts as a small dipole and emits light of the same phase.

Figure 11:
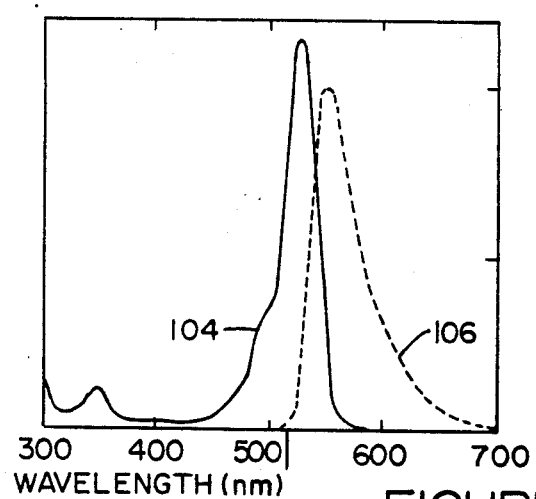
FIG. 11 shows the absorption and emission curves for a typical lasing dye such as Rhodamine 6G.

FIG. 11 shows the peak absorption curve for the Rhodamine 6G dye and its relationship to the peak emission wavelength curve for the same dye. It will be noted that there is a range of wavelength around each peak which represent varying degrees of absorption and emission. Theory would predict that there would only be one or more discrete wavelengths corresponding exactly the specific energy gaps between the metastable states and the ground states. However, since each molecule is made up of many atoms, the electronic structure of the molecule is very complex and there are virtually hundreds of different energy levels represented in each molecule. Further, each molecule is vibrating with thermal energy which makes it a moving source and sink for energy. The movement causes doppler shifts in the various wavelengths emitted and absorbed such that the hundreds of spectral lines "wash" together as bands.

The advantage of using dye molecules as opposed to atoms of an active medium such as neodymium is greater bandwidth. That is, molecules have much more complex electronic structures compared to the electronic structures of atoms. Thus, there are more energy levels available for use in absorbing and emitting energy, and therefore there are more energy gaps representing individual spectral lines of a given frequency in molecules as opposed to atoms. Brownian movement from thermal activity causes these spectral lines to wash together because of doppler shifts in their frequencies. This results in broader bandwidths for light which can be absorbed and emitted which makes the device more useful. The absorption curve is labelled 104 and the emission curve is labelled 106. It can be seen from FIG. 11 that the peak absorption wavelength is slightly shorter than the peak emission wavelength, and that there is a range of wavelengths wherein the dye is both absorbing and emitting. In that range, whichever curve has the higher amplitude will control the net result regarding whether light is absorbed or emitted. That is, for input light in this overlap wavelength range, whether more light comes out than went in depends upon where the wavelength is in the range and the relative magnitudes of the absorption and emission curves at that particular wavelength. The reason that the absorption and emission peaks are separated in terms of wavelength is that the pump band energy level is higher and enough energy must be absorbed to move the electrons of the dye molecule from the ground energy state to the S2 state in FIG. 8. However the emission curve results from the dropping of the electrons from the lower energy metastable state S1 in FIG. 8 back to the ground state G. Since this drop in energy is smaller than the increase in energy during absorption, the frequency of the light emitted will be less at peak emission than the frequency of light absorbed at peak absorption from equation (1). Thus the emission wavelength is longer. Therefore, the pump signal 36 peak should have a wavelength tuned to the peak absorption wavelength while the probe signal should have a wavelength tuned to the peak emission wavelength for maximum gain.

Figure 12:
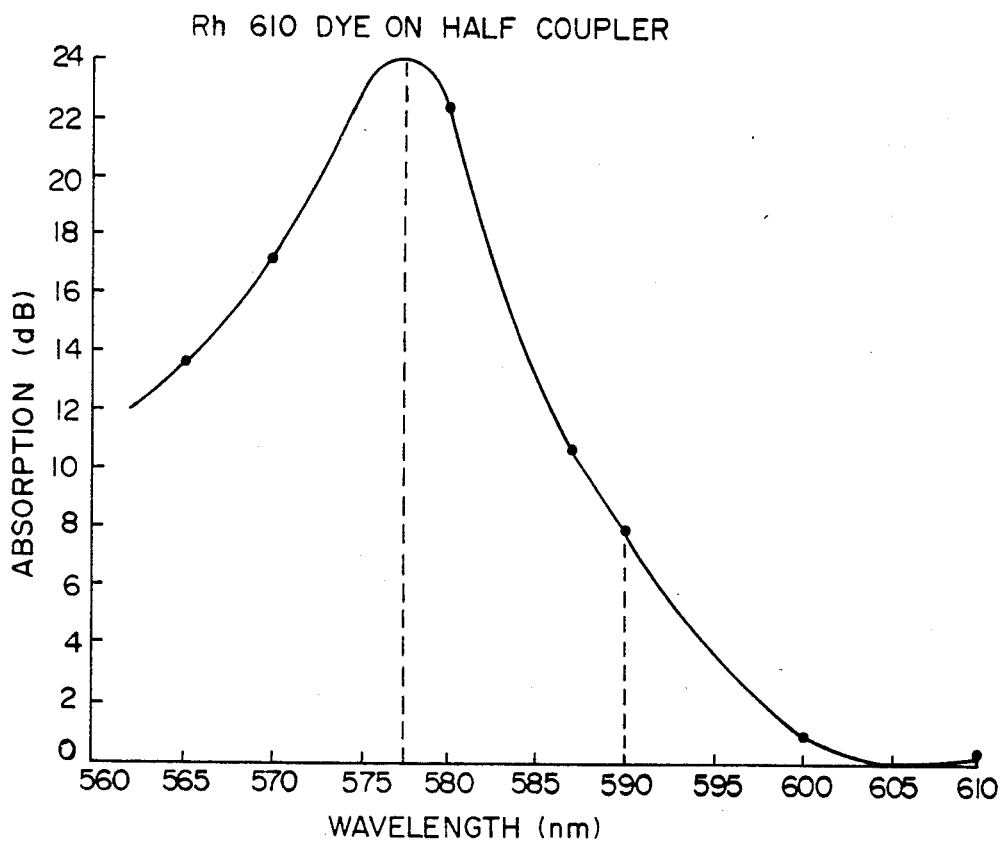
FIG. 12 illustrates the actual absorption curve for the Rhodamine 610 dye used in the preferred embodiment when placed on the fiber surface 72.

Referring to FIG. 12 there is shown the absorption curve for the actual dye used in the preferred embodiment, which was Rhodamine 610. Lasing dyes have different absorption characteristics in bulk than they do when placed upon a half coupler and excited by the evanescent field of guided mode. The curve of FIG. 12 illustrates, for an exemplary case, the absorption for Rhodamine 610 dye if placed on the type of half coupler described above. The absorption characteristics will change if any of the coupler parameters are changed. Further, the absorption characteristics will change with temperature, because the index of the dye changes by a factor on the order of $-10^4$ per degree centigrade. FIG. 12 then is exemplary only.

The particular dye and solvent combination used in the preferred embodiment was Rhodamine 610 with the solvents ethylene glycol and glycerol mixed in a predetermined proportion. The dye concentration was $4 \times 10^{-3}$ molar. The composite index was approximately 1.456 at the operating temperature, but was adjusted initially to be slightly higher so that heating of the dye during pumping brought its index down to 1.456 where maximum gain was found. The ethylene glycol solvent had an index of 1.4318. The glycerol had an index of 1.4746 at room temperature and it was mixed in a volume such that the volume of glycerol to the volume of ethylene glycol ratio was 1.3. This particular dye and solvent combination had a peak gain of 22 dB at 600 nanometers when pumped by a Q switched Nd:YAG laser which was frequency doubled to 532 nm.

Figure 13:
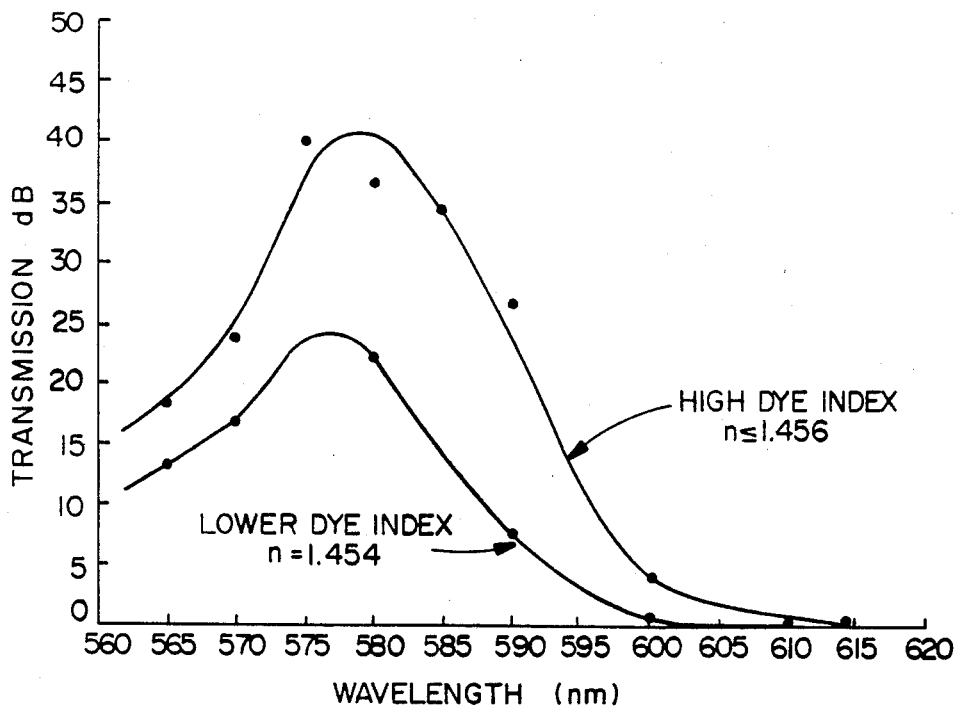
FIG. 13 illustrates the sensitivity of absorption of energy by the dye as a function of dye index of refraction and wavelength.

FIG. 13 shows the sensitivity to pump absorption of the amplifier to the dye index as a variable factor. The upper curve in FIG. 13 represents a dye with a higher index of 1.456 whereas the lower curve represents a lower dye index of 1.454. The curves are plotted in terms of transmission in dB through a half coupler with the dyes having the given indexes placed on the surface 72 versus the wavelength of the input light. Clearly much more light is absorbed for the higher dye index of n=1.456. Obviously the dye with the higher index of refraction closer to the core index of 1.46 causes greater penetration of the evanescent field into the dye, and results in more gain.

The dye absorption characteristics are quite dependent upon the temperature of the dye as noted above. Because the index of the dye changes with changing temperature, the amount of penetration by the evanescent field portion 74 in FIG. 2 into the dye will change with a changing temperature because of a shift in the mathematical solutions to Maxwells Equations caused by the change in index. Because heating of the dye solution 30 occurs when light energy is absorbed in the dye solution, in the preferred embodiment the dye solution 30 is recirculated by a recirculation pump and temperature control unit 110 in FIG. 2. This recirculation pump and temperature control unit is conventional, and any apparatus which is capable of moving the dye solution to and from the surface 72 on the half coupler will be adequate. The pump and temperature control unit 110 is coupled to a dye cavity or channel 112 which can be a separate cavity or liquid channel which is sealed to the surface 72 in such a way that the dye solution 30 in the cavity can completely wet and cover the surface 72 in the half coupler. That is, the dye cavity 112 can be any structure which is sealed to the surface 26 and which can hold the dye solution 30 in contact with the polished cladding surface 72 left by removal of the cladding portion 70 from the fiber 20. Care should be taken to completely fill the groove 76 with a suitable adhesive such as epoxy such that the uniform flat surface 26 is provided for sealing of the dye cavity 112.

The recirculating pump also has another beneficial effect. The molecules of the dye solution 30 can become bleached and unusable for light amplification after a certain number of excitations. That is, after a particular dye molecule is excited on the order of $10^6$ times, the molecule breaks up thereby becoming unusable for further amplification. The recirculating pump 110 provides a means for continually putting new dye molecules in contact with the surface 72 such that the percentage of bleached dye molecules within the range of penetration of the evanescent fluid portion 74 remains small. This provides an advantage for the invention over those devices in the prior art wherein the active medium atoms or molecules are permanently embedded in the fiber core or cladding as by difusing neodymium atoms into a fiber as the active medium. When an active medium molecule is permanently embedded in a waveguide or is doped into a fiber cladding or core, it cannot be removed when it becomes bleached thereby rendering the device inoperative to accomplish its intended purpose. Embedded atoms, as opposed to molecules, however, will not become bleached, because they do not break up.

Finally, the recirculating pump 112 eliminates the problem of triplet states. Referring again to FIG. 8, it is seen that there are two additional energy levels marked T1 and T2. These energy levels are called triplet states and are useless for light amplification for reasons noted above. Atoms or molecules in these triplet states tend to remain there for a relatively long time, i.e., on the order of microseconds, before decaying back to a ground level energy state. Further, when they decay back to the ground state, they do not emit visible light but instead release energy in other forms; these other forms are usually non-radiative energy, as represented by the transition line 114 representing a transition from triplet state T1 to the ground state. As indicated by the dashed transition lines 116 and 118 some percentage of the excited atoms or molecules in the metastable state S1 decay down to the triplet state T1 without releasing any radiated light energy. While in this triplet state, these atoms or molecules are effectively removed from the system in terms of being able to provide stimulated emission for the probe signal.

Further, once in the triplet state T1, the atoms or molecules can be excited to a higher level triplet state T2 by absorbing pump energy from the pump signal 36 as represented by the transition line 120. Decay from the T2 triplet state back to the T1 triplet state does not release any visible light as indicated by the transition line 122. Therefore both of the triplet states T1 and T2 represent useless states for light amplification, because they absorb energy without releasing coherent light via stimulated emission to cause amplification of the probe signal 38. If the dye solution 30 is not continually refreshed and moved across the surface 72, eventually a large percentage of the atoms or molecules near the surface 72 and within the range of the evanescent field penetration 74 will be in the triplet state. This is especially a problem for a static dye system with a continuous wave pump signal and a continuous wave probe signal. Eventually the gain of such static system will fall off, and the system will not be useful for its intended purpose. One solution would be to use pulsed pump signals where the pulse spacing between the pump pulses was long enough such that the molecules in the triplet state had time to decay back to the ground state. However, this effectively limits the maximum pulse rate of the system since the lifetimes of molecules in the triplet state are fairly long relative to the lifetimes in the other energy states such as the metastable state. In a CW source system with a static dye drop, the gain would drop in approximately 100 nanoseconds as the triplet state population begins to build. The pulse spacing required to avoid triplet state buildup in a static dye drop embodiment is on the order of milliseconds.

A solution, which is used in the preferred embodiment, is through use of the recirculation pump 110. The recirculation pump continuously sweeps the dye molecules away from the surface 72 such that any molecules which have entered the triplet state cannot remain near the surface 72 to waste pump energy and not contribute to light amplification. While these atoms are in the reservoir awaiting recirculation back to the surface 72, they have sufficient time to decay back to the ground level state and be ready again for further amplification service.

Although the invention has been described in terms of the preferred embodiment, it will be apparent to those skilled in the art that numerous modifications can be made without departing from spirit and scope of the inventions defined by the claims herein. All such modifications are intended to be included within the scope of their claims appended hereto.

APPENDIX A

| Dye | Solvent[a] | $\lambda_{ABS}$ [nm] | $\lambda_{LAS}$ [nm] |
|---|---|---|---|
| Rhodamine 110 | HFIP | 487 | 540 |
|  | TFE | 490 | 550 |
|  | EtOH.basic | 501 | 560 |
|  | EtOH.acid | 510 | 570 |
|  | DMSO | 518 | 575 |
| Rhodamine 19 | EtOH.basic | 518 | 575 |
|  | EtOH.acidic | 528 | 585 |
| Rhodamine 6G | HFIP | 514 | 570 |
|  | TFE | 516 | 575 |
|  | EtOH | 530 | 590 |
|  | DPA | 537 | 595 |
|  | DMSO | 540 | 600 |
| Rhodamine B | EtOH.basic | 543 | 610 |
|  | EtOH.acidic | 554 | 620 |
| Rhodamine 3 B | HFIP | 550 | 610 |
|  | TFE | 550 | 610 |
|  | EtOH | 555 | 620 |
|  | DMSO | 566 | 630 |
| Rhodamine 101 | HFIP | 572 | 625 |
|  | TFE | 570 | 625 |
|  | EtOH.basic | 564 | 630 |
|  | EtOH.acidic | 577 | 640 |
|  | DMSO | 586 | 650 |

[a] HFIP hexafluoroisopropanol, TFE trifluoroethanol, DMSO dimethyl sulfoxide, DPA N,N—dipropylacetamide.

What is claimed is:

1. A light amplification apparatus for amplifying light at a first wavelength in response to optical pumping by light at a second wavelength, said amplifier comprising:
   a monomode optical fiber having a core and a cladding, said fiber arcuately mounted and having a portion of said cladding removed on one side of said fiber over a predetermined region to provide a surface on said cladding which is sufficiently close to said core exclusively at said one side of said fiber to allow evanescent field penetration at said surface of light propagating in said fiber at said first and second wavelengths; and
   a liquid dye solution, in communication with said surface, for exposure to the evanescent field of said light at said first and second wavelengths, said solution having a peak absorption wavelength which substantially matches said second wavelength and a peak emission wavelength which substantially matches said first wavelength, such that said solution absorbs light energy at said second wavelength to excite dye molecule in said solution to a higher energy state, said light at said first wavelength stimulating emission of light energy by the exited dye molecules at said first wavelength to cause amplification of said light at said first wavelength.

2. An apparatus as defined in claim 1 wherein said dye has its index of refraction tuned to a predetermined amount less than the index of said core.

3. An apparatus as defined in claim 1 additionally comprising means for circulating said solution across said surface.

4. An apparatus as defined in claim 1 additionally comprising means for controlling the temperature of said solution to maintain the refractive index of said solution at a predetermined value which is no greater than the index of said core.

5. An apparatus as defined in claim 1 or 2 or 3 or 4 additionally comprising a block having an arcuate groove therein for mounting said fiber.

6. An apparatus as defined in claim 3 wherein said circulating means comprises a chamber for containing said solution, and a circulation means for circulating said solution within said chamber.

7. An apparatus for amplifying light comprising:
a pump light source for supplying an excitation light signal;
a signal light source for supplying a probe light signal for amplification;
a monomode optical fiber, having a core and cladding said fiber coupled to receive said light signals from said light sources, said fiber having a predetermined amount of cladding removed to form a surface on said cladding of said fiber which is sufficiently close to said core to cause evanescent field penetration of said surface by both of said light signals;
means for mounting said fiber along a predetermined radius of curvature; and
a liquid dye solution having an index of refraction tuned to a predetermined amount less than the index of said core, said dye solution in contact with said surface.

8. An apparatus as defined in claim 7 further comprising a chamber sealed over said surface of said fiber to contain said dye solution.

9. An apparatus as defined in claim 7 wherein said chamber has an inlet port and an outlet port and said apparatus further comprises a pump which circulates said dye solution in and out of said chamber.

10. An apparatus as defined in claim 7 or 8 or 9 further comprising a temperature control system for controlling the temperature of said dye solution to maintain the index of refraction of said solution at a predetermined amount less than the index of said core.

11. An apparatus as defined in claim 1, further comprising a chamber sealed around said predetermined region for containing said dye solution.

12. An apparatus as defined in claim 11 wherein said chamber has inlet and outlet ports and further comprising a pump for circulating said dye solution in and out of said chamber.

13. An apparatus as defined in claim 12 further comprising a temperature control means for controlling the temperature of said dye solution.

14. An apparatus as defined in claim 7 wherein said excitation signal supplied by said pump light source has a wavelength substantially matched to a peak absorption wavelength of said dye solution.

15. An apparatus as defined in claim 7 or 14 wherein said probe signal supplied by said signal light source has a wavelength substantially matched to a peak emission wavelength of said dye solution.

16. An apparatus as defined in claim 7, further comprising a filter for separating said excitation light signal from said probe light signal after said signals pass through said amplifier.

17. A method of manufacturing a light amplifier comprising:
providing a monomode optical fiber having a core and a cladding;
removing a portion of the cladding from one side of said monomode optical fiber in a predetermined region of said fiber to form a surface such that a reduced amount of cladding exists between the core and the surface of said fiber in said predetermined region; and
placing a liquid dye solution having a predetermined index of refraction in contact with said surface of said fiber in said predetermined region.

18. The method of claim 17 wherein said placing step includes the steps of:
sealing a chamber over said predetermined region of said fiber;
introducing said dye solution into said chamber such that said dye solution contacts said fiber surface in said predetermined region.

19. The method of claim 18 further comprising the steps of forming inlet and outlet ports in said chamber and coupling a recirculation pump to said ports for circulation of said dye solution through said chamber.

20. The method of claim 17 further comprising the step of controlling the temperature of said dye solution in said chamber to maintain said predetermined index of refraction.

21. The method of claim 17 wherein said removing step includes the steps of:
arcuately mounting said fiber along a radius of curvature; and
polishing off a portion of said cladding on said one side of said fiber to form a flat surface on said one side of said fiber.

22. The method of claim 17 additionally comprising:
coupling a pump light source to said monomode optical fiber for exciting said dye solution by launching pump light in said fiber;
coupling a probe light source to said monomode optical fiber for stimulating light emission from said dye solution by launching probe light in said fiber.

23. The method of claim 22 further comprising the step of selecting said pump light and probe light to have first and second wavelengths respectively such that said first wavelength substantially coincides with an absorption peak wavelength of said dye solution and said second wavelength substantially coincides with a peak emission wavelength of light emitted from said dye solution.

24. The method of claim 23 wherein the index of said dye solution is selected to be a predetermined amount less than the index of the core of said fiber.

25. The method of claim 24 further comprising the step of controlling the temperature of said dye solution so as to keep the index of said dye solution a predetermined amount less than the index of the core of said fiber.

26. The method of claim 25 further comprising circulating said dye solution across the surface of said fiber.

27. The method of claim 23 wherein said pump light comprises pulses of light at said first wavelength.

28. The method of claim 27 wherein said probe light comprises light pulses at said second wavelength.

29. The method of claim 28 wherein said probe light pulses are launched during the duration of said pump light pulses such that the probe light pulses are contained within the pump light pulses.

30. An apparatus for amplifying light comprising:

a monomode optical fiber for propagating a lightwave, said fiber having a core and a cladding, a predetermined amount of said cladding removed at a selected location on said fiber to form a cladding surface at which the thickness of said cladding is reduced to allow evanescent fluid penetration of said lightwave at said surface;

a chamber containing laser dye having a predetermined index of refraction sealed over said cladding surface;

a pump for circulating said dye in said chamber; and a temperature control system for maintaining the index of said dye at said predetermined index.

* * * * *